(12) United States Patent
Schuh et al.

(10) Patent No.: US 11,046,870 B2
(45) Date of Patent: Jun. 29, 2021

(54) TANGENTIAL JOINING METHOD

(71) Applicant: TESA SE, Norderstedt (DE)

(72) Inventors: Christian Schuh, Hamburg (DE); Björn Zeysing, Hamburg (DE); Klaus Keite-Telgenbüscher, Hamburg (DE)

(73) Assignee: TESA SE, Norderstedt (DE)

( * ) Notice: Subject to any disclaimer, the term of this patent is extended or adjusted under 35 U.S.C. 154(b) by 16 days.

(21) Appl. No.: 15/767,754

(22) PCT Filed: Oct. 18, 2016

(86) PCT No.: PCT/EP2016/074933
§ 371 (c)(1),
(2) Date: Apr. 12, 2018

(87) PCT Pub. No.: WO2017/067904
PCT Pub. Date: Apr. 27, 2017

(65) Prior Publication Data
US 2018/0305586 A1 Oct. 25, 2018

(30) Foreign Application Priority Data

Oct. 19, 2015 (DE) .................... 10 2015 220 311.5

(51) Int. Cl.
C09J 5/02 (2006.01)
F16B 11/00 (2006.01)
(Continued)

(52) U.S. Cl.
CPC ............. *C09J 5/02* (2013.01); *B62D 27/026* (2013.01); *B62D 65/024* (2013.01); *C09J 5/06* (2013.01);
(Continued)

(58) Field of Classification Search
CPC ....... C09J 5/02; C09J 5/06; C09J 7/381; C09J 11/04; C09J 2400/12; C09J 2409/00;
(Continued)

(56) References Cited

U.S. PATENT DOCUMENTS 5,072,605 A * 12/1991 Imazu .................... B21D 51/26
72/347
9,452,462 B2 9/2016 Elgimiabi
(Continued)

FOREIGN PATENT DOCUMENTS

DE 2124669 A1 12/1971
DE 3332513 A1 4/1985
(Continued)

OTHER PUBLICATIONS

Machine translation of DE 10 2015 203 795 date unknown.*
(Continued)

*Primary Examiner* — John L Goff, II
(74) *Attorney, Agent, or Firm* — Norris McLaughlin, P.A.

(57) ABSTRACT

The invention relates to a joining method wherein a first surface (2) of a first adherend (1) and a second surface (8) of a second adherend (6) are bonded to one another by provision of an adhesive tape (3) having a first side (4) and a second side (7), there being disposed on the first side (4) a first activatable adhesive and on the second side (7) a second activatable adhesive, the latter being an activatable pressure-sensitive adhesive, the first side (4) of the adhesive tape (3) is contacted with the first surface (2) of the first adherend (1) to produce a preliminary assembly, the second surface (8) of the second adherend (6) is joined in a joining movement to the second side (7) of the adhesive tape (3), the joining movement having a tangential component and a perpendicular component relative to the second side (7) of the adhesive tape (3), with a ratio between tangential and
(Continued)

Figure 1:
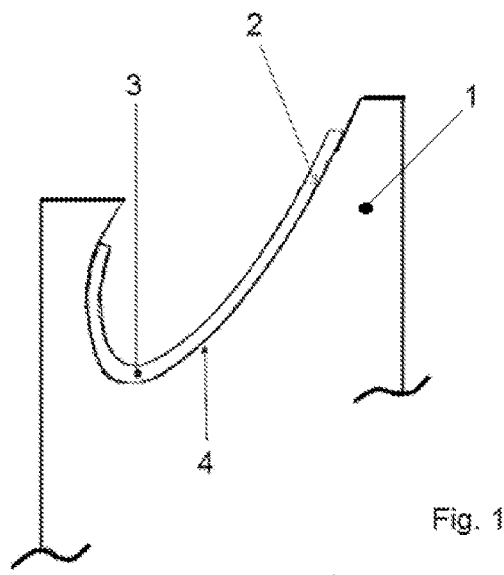

perpendicular components of greater than 0.5, where a region of contact between second surface (8) of the second adherend (6) and second side (7) of the adhesive tape (3) is provided with a nonaqueous lubricant.

20 Claims, 2 Drawing Sheets

(51) Int. Cl.
    *B62D 27/02*         (2006.01)
    *C09J 5/06*          (2006.01)
    *C09J 7/38*          (2018.01)
    *B62D 65/02*         (2006.01)
    *C09J 11/04*        (2006.01)

(52) U.S. Cl.
    CPC .............. *C09J 7/381* (2018.01); *C09J 11/04* (2013.01); *F16B 11/006* (2013.01); *C09J 2301/414* (2020.08); *C09J 2400/12* (2013.01); *C09J 2400/163* (2013.01); *C09J 2409/00* (2013.01); *C09J 2463/00* (2013.01); *C09J 2467/006* (2013.01); *C09J 2475/00* (2013.01); *C09J 2495/00* (2013.01)

(58) Field of Classification Search
    CPC ............... C09J 2463/00; C09J 2475/00; C09J 2495/00; C09J 2467/006; B29C 66/026; B29C 66/028; B29C 66/0046; B29C 66/00461; B62D 27/026; B62D 65/024; F16B 11/006
    USPC ......................................................... 156/293
    See application file for complete search history.

(56) References Cited

U.S. PATENT DOCUMENTS

| | | | |
|---|---|---|---|
| 2004/0132628 A1* | 7/2004 | Geke | B21C 9/00 508/451 |
| 2014/0193603 A1* | 7/2014 | Elgimiabi | B21D 39/021 428/58 |

FOREIGN PATENT DOCUMENTS

| | | | | |
|---|---|---|---|---|
| DE | 10333627 A1 | 5/2004 | | |
| DE | 102013000629 A1 * | 7/2014 | ............ | B62D 25/20 |
| DE | 102013222739 A1 | 12/2014 | | |
| DE | 102015203795 A1 | 9/2016 | | |
| GB | 1339775 A | 12/1971 | | |
| JP | 59-91021 A | 5/1984 | | |
| JP | 5-44881 A | 2/1993 | | |
| JP | 5-247479 A | 9/1993 | | |
| JP | 2002-284045 A | 10/2002 | | |
| JP | 2014-95021 A | 5/2014 | | |
| JP | 2014-523930 A | 9/2014 | | |
| WO | 2011137241 A1 | 11/2011 | | |

OTHER PUBLICATIONS

Machine translation of DE 10 2013 000 629 date unknown.*
Definition of "pressure-sensitive" from Merriam-Webster.com date unknown.*
International Search Report for corresponding application PCT/EP2016/074933 dated Jan. 5, 2017.
Written Opinion of the International Searching Authority for corresponding application PCT/EP2016/074933 dated Jan. 5, 2017 (English translation not available).
Translation of Office Action dated Jul. 25, 2019, in connection with Japanese Patent Application No. 2018-538945.
Wieczorek, A., "Fugen im Karosseriebau [Joining in vehicle body constructions]," presented at Bad Nauheim on Mar. 24-26, 2015.

* cited by examiner

TANGENTIAL JOINING METHOD

This application is a § 371 U.S. National stage of PCT International Patent Application No. PCT/EP2016/074933, filed Oct. 18, 2016, which claims foreign priority benefit of German Application No. DE 10 2015 220 311.5 filed Oct. 19, 2015, the disclosures of each of which patent applications are incorporated herein by reference.

The invention relates to a joining method as described herein.

In order for support structures to be produced in vehicle bodies, especially in automotive engineering, it is common for profiles to be nested with one another. What this means is that a first profile has a milled or other recess, into which a second profile, shaped correspondingly, is inserted or engaged. Together, therefore, the two profiles form a part-shell of a support. The support structure itself may be configured as an open profile or as a hollow profile and may encompass both parts. The purpose of the nesting is generally to stiffen or seal the overall structure. The profiles used for these purposes may be made, for example, from extruded alloy metal, or may have been shaped from sheet metal blanks.

During the production of the nested arrangement, the profiles are in many cases displaced in one another in such a way that the connecting faces move at least partially tangentially to one another. The connecting faces may be parts of the profile body or may be shaped flanges, their key function being to connect the profiles.

In the prior art, the profiles used for the nested arrangement are welded to one another, generally, at the connecting faces. The primary method employed in this case is that of stop welding. Alternatively, the profiles may be joined to one another by soldering, crimping, clinching or riveting. Combinations of the methods are also used.

As well as the joining techniques referred to above, adhesive bonds as well are increasingly in use for the joining of profiles. The adhesive bonds not only increase the stiffness of the connection but are also suitable, in particular, for the joining of different materials. At other locations in the vehicle body, beads of adhesive are used for sealing, for thermal and electrical insulation, and for noise reduction. The separation of, say, aluminum and steel in a jointed connection by means of the adhesive ensures that no galvanic corrosion is developed at this location.

Adhesives used for producing support structures are activatable structural adhesives of high viscosity. These adhesives are applied generally in the form of beads. During and/or after activation, the adhesives cure usually through a chemical reaction. Activation may be accomplished by a supply of heat or by moisture, radiation—UV radiation, for example—exclusion of oxygen, or other known mechanisms.

Where two or more profiles, as part of the shell construction of vehicle bodies, for example, are nested in such a way that there is a tangential movement of the connecting face coated with beads of structural adhesive, the structural adhesive is then shifted from its position and smeared in an uncontrolled way. As a result, bonding reliability is no longer assured. The relevant prior art is represented, for example, by the paper Joining with adhesive tapes in car body manufacture, Alexander Wieczorek, given at the conference Fügen im Karosseriebau [Joining in vehicle body construction], Bad Nauheim Mar. 24-26, 2015.

Proposed herein is the use of adhesive tapes for the bonding of vehicle bodywork components.

Also known are adhesive tapes which attain strengths suitable for the production of support structures generally by means of a physical or chemical curing process. The adhesive tapes may or may not have pressure-sensitive adhesive tack. In that case the adhesive tape generally has no additional carrier. Nontacky adhesive tapes are generally first joined by means of heating to a first profile, to produce a preliminary assembly. As the adhesive tape has sufficient viscosity, the nesting procedure can be carried out with no shifting of the adhesive geometry in spite of tangential movement. After joining, further heating then initiates a flow of the adhesive onto the second profile and also, where appropriate, chemical curing. A disadvantage here is the high cost and effort involved in producing the preliminary assembly.

In the case of tacky adhesive tapes, the preliminary assembly can be produced simply through self-adhesiveness. In the case of the tangential movement during the joining operation, however, the adhesive tape attaches to the second profile, thus hindering the joining procedure and disrupting the clean formation of the adhesive seam. After joining has taken place, chemical curing is then generally initiated by means of further heating or the ingress of atmospheric moisture. In the paper referred to, the use is proposed of a hybrid adhesive tape having a tacky side and a nontacky side. A disadvantage of that embodiment is that the adhesive tape inevitably has a complex, multilayer construction. Moreover, the assembly between the adherend component and the nontacky side comes about only after the system has been heated. Before that, the assembly has no strength.

When joining pressure-sensitive adhesive tapes with tangential movement, it is known practice to use water, with or without a surfactant, as the lubricant. The water then slowly diffuses out of the bonded joint, and so adhesion to the substrate surfaces is developed. Where reactive adhesive tapes are used, of the kind employed for producing support structures, however, this has the disadvantage that a high level of moisture during the curing reactions could prevent full curing. This is the case, for example, with the widespread epoxy resin adhesives. The bond then loses strength. In the case of moisture-curing adhesives, active wetting during joining would trigger the curing reaction prematurely on the surface of the adhesive tape, to the detriment of the attachment of the adhesive to the profile surface. Moreover, a high moisture content can lead to unwanted foaming of the adhesive in the course of subsequent heating. It is possible, not least, for the relatively high volume of water to lead to corrosion.

It is an object of the invention, therefore, to provide a joining method wherein two adherends can be bonded more easily by means of a tacky adhesive tape with at least partial tangential movement of the adherends. In this case the joining procedure with at least partial tangential movement is to be carried out without substantial deformation of the adhesive tape geometry or shifting of the adhesive tape fixed beforehand.

It is also an objective of the present invention to provide an adhesively bonded assembly having the advantages stated.

With regard to the method, the object is achieved in a first aspect by means of a method as stated at the outset that has the features as described herein.

In a second aspect, the object is also achieved by a method as stated at the outset that has the features as described herein.

In accordance with the invention, two adherends are bonded to one another by an adhesive tape. A first side of the adhesive tape is first bonded to a first surface of a first adherend. On the first side of the adhesive tape there is a first activatable adhesive disposed. Disposed on the second side is a second activatable adhesive, which is an activatable pressure-sensitive adhesive. The first and second adhesives may be identical to or different from one another. With preference the first adhesive is likewise an activatable pressure-sensitive adhesive. First of all a preliminary assembly is produced from the first adherend and the adhesive tape. The preliminary assembly is then contacted by the free second side of the adhesive tape, to which the second adhesive is applied, with a second surface of a second adherend. This "contacting" is accomplished by a joining movement which comprises a tangential component and a perpendicular component in relation to the second side of the adhesive tape, with the ratio between tangential and perpendicular components, in relation in particular to at least part of the second side of the adhesive tape, being greater than 0.5, preferably greater than 1, more preferably greater than 4.

At a ratio of more than 0.5, the tangential component of the joining movement is already sufficiently large for significant attachment of the second side of the pressure-sensitive adhesive to the second adherend to take place, thus hindering the attainment of the final position of the joining movement. At a ratio of more than 1, the tangential component is predominant; in a ratio of 4 and upward, the movement is determined so greatly by the tangential component that it is impossible to make use, for example, of pasty adhesives (see Wieczorek loc. sit.), and so the method of the invention can be used with particular advantage.

The ratio of the two components to one another may be very large, if the joining movement takes place almost tangentially to the second side of the adhesive tape. In extremis the joining movement may also take place completely tangentially to the second side of the adhesive tape.

In order to prevent displacement or deformation of the adhesive tape between the first and second adherends, the region of contact between the second surface of the second adherend and the second side of the adhesive tape has a nonaqueous lubricant. As a result of the nonaqueous lubricant, the tacky second side of the adhesive tape, on first making contact with the second surface of the second adherend, does not attach immediately to the second surface, but is instead able to glide along it until it reaches an end position of the first and second adherends relative to one another.

In particular, the second side of the adhesive tape has a tacky adhesive. The adhesive is shaped in a layer-like or sheetlike way. The adhesive tape may consist of a single, homogeneous adhesive, but it is also conceivable for the adhesive tape to have a multilayer construction, having in particular an inner carrier layer coated on either side with a respective adhesive.

It is preferred, however, for the adhesive tape to have a single-layer construction and for the adhesive tape to consist of a single-layer pressure-sensitive adhesive (PSA), preferably an activatable PSA. As a result, the preliminary assembly can be easily produced, and the adhesive tape is simple and inexpensive to produce.

The thickness of the adhesive tape corresponds to the thickness customary for adhesive tapes, in other words, for instance, from 1 μm to 5 mm. Preferred for structural adhesive bonds in the automobile segment is a thickness of 50 μm to 5 mm, more particularly of 150 μm to 2 mm. With large adhesive tape thicknesses of 200 μm to 5 mm, more particularly of 500 μm to 5 mm, premature attachment of the second adhesive tape side to the second adherend surface is particularly disadvantageous, since in that case a positional error of the adhesive bond becomes particularly large. Adhesive tapes in this thickness range, therefore, are used preferably in the method of the invention.

The adhesive tape may have a single-layer or multilayer construction. In the case of a multilayer construction of the adhesive tape, there may also be further layers present, of the kind well known to the person skilled in the art of adhesive tapes: examples are further layers of adhesive or further carrier layers, primer layers or release layers, or layers having specifically physical functions, examples being layers with optical effect or layers which promote or inhibit permeation, layers featuring thermal or electrical conductivity, etc.

The adhesive tape is generally provided as a section of a long adhesive tape. The adhesive tape may be provided, for example, as a sheet or as a section of a roll, or, favorably, as a diecut. The adhesive tape may have a simple coherent construction or else there may be holes or openings made in the adhesive tape. The adhesive tape may fully cover the surface bounded by its external periphery, or indeed, if it has openings, may also cover only parts thereof or leave parts free. The adhesive tape is substantially larger in two dimensions than in a third dimension. In the first two dimensions, however, it may well also be of approximately the same size, thus having a circular, square or other external sheetlike form.

In accordance with the invention, the second side is provided with an activatable pressure-sensitive adhesive. Favorably, the first and second sides of the adhesive tape are provided with an activatable pressure-sensitive adhesive. In specific embodiments, the first and second sides may also comprise the same adhesive.

As activatable PSAs it is possible in principle to employ all customary PSA systems with activated bonding. The activation is generally accomplished by an input of energy, by means for example of actinic radiation or heat or mechanical energy, such as ultrasound or friction, for example. Use is also made, however, of chemical activation by means, for example, of moisture or oxygen or the absence thereof, or by other chemical activators, such as peroxides, for example.

Heat-activatedly bonding PSAs can be classed fundamentally into two categories: thermoplastic heat-activatedly bonding PSAs (hotmelt PSAs) and reactive heat-activatedly bonding PSAs (reactive PSAs). This classification also includes those PSAs which can be assigned to both categories, namely reactive and simultaneously thermoplastic heat-activatedly bonding PSAs (reactive hotmelt PSAs). For the production of support structures from nested profiles, the preference is for reactive PSAs.

Thermoplastic PSAs are based on polymers which on heating undergo reversible softening and which solidify again in the course of cooling. Thermoplastic PSAs which have emerged as being advantageous are in particular those on the basis of acrylates, of polyolefins and copolymers of polyolefins, and of acid-modified derivatives thereof, of thermoplastic polyurethanes, of polyesters and their copolymers, and also of block copolymers such as styrene block copolymers.

"On the basis of", "based" or "based on" means presently that the properties of the adhesive are determined at least greatly by the fundamental properties of one component, referred to as the base polymer, though without ruling out the additional influencing of the base polymers through use of modifying auxiliaries or adjuvants or of further components in the composition. In particular this may mean that the fraction of the base polymer in the overall mass of a thermoplastic PSA is more than 50 wt %.

In contrast, reactive heat-activatedly bonding PSAs include reactive components as well as the base polymer. The reactive components are also referred to as "reactive resins", in which, by the heating procedure, a crosslinking process is initiated which after ending of the crosslinking reaction ensures a permanent stable connection.

The base polymers of such adhesives preferably comprise elastic components, as for example synthetic nitrile rubbers, polyurethanes, acrylates or styrene block copolymers. Elastic components of these kinds give the heat-activatedly bonding adhesive a particularly high dimensional stability even under pressure, on account of its high flow viscosity. The fraction of the base polymer in the overall mass of a reactive heat-activated PSA may also be less than 50 wt %, but generally more than 10 wt %.

Radiation-activatable PSAs are likewise based on reactive components. The reactive components may include, for example, polymers or reactive resins in which the irradiation initiates a crosslinking process which on ending of the crosslinking reaction ensures a permanent, stable connection. Adhesives of this kind preferably also include elastic components, of the kind set out above.

Radiation-activatable PSAs are to be distinguished from radiation-crosslinked PSAs, in which the properties of pressure-sensitive adhesiveness are set by means of radiation crosslinking during the production of the adhesive tape. With radiation-activatable PSAs, the radiative activation takes place at application. Following radiative activation, the adhesive is generally no longer tacky.

Activatable pressure-sensitive adhesive tapes also include pressure-sensitive adhesive tapes assembled from two or more films of adhesive, as disclosed in DE 10 2013 222739 A1.

They are activated by the contacting of the two or more films of adhesive.

As reactive resins it is possible in principle to use all reactive constituents which are known to the person skilled in the art of PSAs or reactive adhesives and which form crosslinking reactive constituents and/or macromolecule-forming reactive constituents, of the kind described for example in Gerd Habenicht: Kleben—Grundlagen, Technologien, Anwendungen ["Adhesive bonding—Principles, technologies, applications"], 6th edition, Springer, 2009. These by way of example are constituents which form polyepoxides, polyesters, polyethers, polyurethanes, and also polymers based on phenolic resin, on cresol, or on novolac, and polysulfides, polysiloxanes (constructed preferably from silane-terminated polymers (STP)) or acrylic polymers (acrylic, methacrylic).

The fraction of the reactive resin in the overall mass of an activatable PSA based on a selected reactive resin may also be less than 50 wt %, but generally more than 10 wt %.

Elastomers which can be used are in principle all customary elastomers in the PSA field, of the kind described in, for example, the "Handbook of Pressure Sensitive Adhesive Technology" by Donatas Satas (Satas & Associates, Warwick 1999).

These are, for example, elastomers based on acrylates and/or methacrylates, polyurethanes, natural rubbers, synthetic rubbers such as butyl, (iso)butyl, nitrile or butadiene and ethylene-propylene-diene rubbers, styrene block copolymers with an elastomer block composed of unsaturated or partly or fully hydrogenated polydiene blocks (polybutadiene, polyisoprene, poly(iso)butylene, copolymers of these, and other elastomer blocks familiar to the skilled person), polyolefins, fluoropolymers and/or silicones. Also known is the use of polyamides, particularly their elastic copolymers (Pebax), or polyhydroxyethers (e.g., phenoxy resins).

Where rubber or synthetic rubber or blends produced therefrom are used as base material for the PSA, the natural rubber may be selected in principle from all available grades such as, for example, crepe, RSS, ADS, TSR or CV products, depending on the required level of purity and of viscosity, and the synthetic rubber or synthetic rubbers may be selected from the groups of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM) or ethylene-vinyl acetate copolymers (EVA) and/or blends thereof.

The elastomer may be linear, branched, star-shaped or grafted in structure, to give but a few examples, and may be constructed as a homopolymer, a random copolymer, an alternating copolymer, or block copolymers. The designation "random copolymer" in the sense of this invention includes not only copolymers in which the comonomers employed in the polymerization are incorporated purely statistically, but also those in which there are gradients in the comonomer composition and/or local accumulations of individual varieties of comonomer in the polymer chains. Individual polymer blocks may have a copolymer block (randomly or alternating) construction.

As activatable adhesives which are nontacky, of the kind which may be employed on the first side of the adhesive tape, it is possible in principle for all customary activatedly bonding adhesive systems to be employed. As for the activatable PSAs, activation is generally accomplished by an input of energy, by means of actinic radiation or heat, for example. Use is also made, however, of chemical activation, by means for example of moisture or oxygen or exclusion thereof, or of other chemical activators, such as peroxides, for example.

The further description corresponds to that of the activatable PSAs.

The activatable PSA and/or the activatable adhesive may also be implemented in the form of an incompatible blend of at least two activatable PSAs and/or activatable adhesives.

In the case of a multilayer construction, the adhesive tape may also comprise a carrier material.

The carrier material encompasses all sheetlike structures, examples being two-dimensionally extended films or film sections, tapes of extended length and limited width, tape sections, diecuts (in the form, for example, of edge surrounds or borders of an (opto)electronic arrangement), multilayer arrangements, and the like. For different applications it is possible to combine any of a very wide variety of different carriers, such as films, woven and nonwoven fabrics, and papers, for example, with different adhesives.

As material for the carrier of the adhesive tape, preference is given to using polymer films, film composites, or films or film composites with organic and/or inorganic layers. These kinds of films/film composites may consist of any common plastics used for film production, with examples, but without limitation, including the following:

polyethylene, polypropylene—more particularly the oriented polypropylene (OPP) produced by monoaxial or biaxial drawing, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), or polyimide (PI).

The carrier may be a combination, moreover, with organic or inorganic coatings or layers. This can be done by customary techniques such as, for example, surface coating, printing, vapor coating, sputtering, coextruding or laminating. Examples—though without limitation—here include, for instance, oxides or nitrides of silicon and of aluminum, indium-tin oxide (ITO), or sol-gel coatings.

The joining method of the invention is preferably employed in order to bond two oil-coated first and second surfaces of first and second adherends to one another.

In body construction in the automobile industry, in particular, the adherends take the form of metal bodywork panels coated with oil. In one advantageous embodiment of the activatable PSA, therefore, the PSA is furnished with at least one oil absorber. The oil absorber absorbs the oil on contact of the adhesive with the surface of the adherend, and the PSA is able to develop a firm connection with the joining surface. Suitable oil absorbers are in principle all oil absorbers known to the skilled person, and may take the form of a particulate solid or a liquid. Oil absorbers used are generally materials from the group of the inorganic solids, the synthetic organic compounds, and the natural organic compounds.

By "particles" are meant, in the sense of DIN 53206-1: 1972-08, primary particles, aggregates, and agglomerates of the oil absorber or oil absorbers. The "particle size" refers to the maximum extent of a particle. The particle size is determined preferably by laser diffraction in accordance with ISO 13320 (the dispersing step dispersing agglomerates but not aggregates), although other methods known to the skilled person are also suitable. The possible shapes of the particles are very diverse—examples are spherical, rodlet-shaped, fibrous, or platelet-shaped.

The oil absorber is preferably selected from the group encompassing materials based on phyllosilicates, zeolites, silica, graphites, lime, polymers, celluloses and their derivatives, aerogels, polyurethanes, polyolefins, acrylate-nitrile-alcohol polymers, urethane-isocyanate-alcohol polymers, perlites, silk plants, peat, straw, and rubber.

The first side of the adhesive tape is contacted with the first surface of the first adherend to produce a preliminary assembly. The contacting encompasses the at least part-area application of the first side of the activatable pressure-sensitive adhesive tape to the first surface of the first adherend. During this step the adhesive tape—where there is a PSA on the first side of the adhesive tape—is generally not activated. The assembly hence comes about only by virtue of the tacky properties of the adhesive tape. It is, however, also conceivable for the activatable pressure-sensitive adhesive tape to be activated even before or during the contacting, for instance if the chemical reaction is very slow and is not concluded by the time of the joining of the second substrate. Where the first side of the adhesive tape bears an activatable adhesive which is not tacky, in general at least the activatable adhesive is activated on the first side. Alternatively, the first surface of the first adherend can also be activated, if it is of activatable design.

The contacting may be accomplished by any methods customary in the application of adhesive tapes, such as by manual application, rolling, rollers, or contactless methods such as compressed-air application, for example.

The second side of the adhesive tape is joined to the second surface of the second adherend in a joining movement. Joining faces referred to are the second side of the adhesive tape already applied, and the surface of the second adherend that comes to lie on this side after joining. The surfaces are of substantially the same size and of the same geometric form. The joining movement is the generally linear movement, as for example the movement of the preliminary assembly to the second adherend, or that of the second adherend to the preliminary assembly, which leads the two joining faces into a position where one overlies the other. The joining movement can be broken down into a component perpendicular to the second side of the adhesive tape, and a component tangential to the second side of the adhesive tape, the two components being perpendicular to one another. The ratio between tangential movement and perpendicular movement is greater than 0.5, preferably greater than 1, more preferably greater than 4.

In accordance with the invention, the region of contact between the second joining face and the second side is provided with a nonaqueous lubricant. The lubricant enables a sliding of the surface of the second surface of the second adherend over the tacky surface of the adhesive tape.

In the PSA field, the skilled person would not select a lubricant that remains permanently in the PSA, since the lubricant would adversely affect the adhesion or the cohesion of the PSA. In the prior art, therefore, an evaporating liquid, such as water, for example, which as far as possible is incompatible with the adhesive, is selected, so that there is no dissolution of the lubricant in the adhesive. In the case of an activatable adhesive, however, an evaporating liquid would be a disadvantage, since residues of the liquid can lead to unwanted foaming during the activating step, particularly in the case of thermal activation.

In the case of the method of the invention, therefore, lubricants advantageously used are those which at ambient pressure have a boiling temperature of more than 120° C., more particularly more than 150° C., and very preferably more than 200° C.

Since the lubricant is advantageously not removed from the bonded joint by evaporation, it is advantageous if it is compatible with the adhesive, in particular on the second side of the adhesive tape and/or on the material of the second substrate, preferably with the adhesive, so that it can be absorbed by the adhesive, through processes of diffusion, for example. As a result, the lubricant is removed from the interface between the second adhesive tape surface and the surface of the second substrate, hence allowing an adhesive bond to be developed more effectively.

In order to facilitate a process of diffusion, and the sliding, provision is made in accordance with the invention for the lubricant to be a fluid at room temperature. Room temperature here refers to a temperature of 15-30° C., preferably of 25° C.

The fluidity is expressed and described hereinbelow by the dynamic viscosity. A fluid so designated is a compound having a dynamic viscosity of less than $10^8$ Pa s.

The dynamic viscosity is determined in general according to DIN 53019. The viscosity is measured in a cylinder-type rotational viscometer having a standard geometry according to DIN 53019-1 at a measuring temperature of 25° C. and a shear rate of 1 $s^{-1}$. Given that this method is unable to determine very high viscosities, it is also usual to ascertain the (complex) viscosity according to ISO 6721-10 at 25° C. and a frequency of 1 rad/s.

The fluid is not restricted in the nature of its fluidity: it may, for example, comprise newtonian, dilatant, pseudoplastic, plastic (with Bingham or Casson fluidity), shear time-dependent, thixotropic, or rheopectic liquids.

The lubricant in the method of the invention preferably has a dynamic viscosity of less than or equal to 10 Pa s, measured according to DIN 53019-1 at a measuring temperature of 25° C. and a shear rate of 1 s$^{-1}$.

In order to form a lubricious film on at least one of the joining faces, moreover, provision is made in accordance with the first aspect of the invention for the lubricant to have a dynamic viscosity of more than 5 mPa s as measured according to DIN 53019-1 at a measuring temperature of 25° C. and a shear rate of 1 s$^{-1}$. If the viscosity is lower, the risk exists of formation of drops due to the surface tension of the lubricant. The lubricant preferably has a dynamic viscosity of more than 100 mPa s.

To form an extremely coherent lubricious film on the surface of the adhesive, effective wetting of the adhesive with the lubricant is an advantage. In one embodiment of the method of the invention, therefore, the lubricant used preferably has a static contact angle, measured between a drop of the lubricant and the second side of the adhesive tape, lying beneath the drop, of less than or equal to 60°, measured at 23° C. and 50% relative atmospheric humidity by dropwise application of 4 μl of the lubricant. The contact angle is preferably less than or equal to 40°, more preferably less than or equal to 15°. A low contact angle indicates effective wetting of the adhesive by the lubricant.

In the formation of a lubricious film it is necessary to prevent the lubricant being absorbed too early by the PSA or by the substrate, with the consequent deterioration of the lubricating effect. The lubricant must therefore on the one hand be compatible with the adhesive on the second side, but on the other hand must be only slowly absorbed by it. This is verified by a slow development of the peel adhesion on a steel substrate coated with 1 g/m$^2$ of the lubricant, at 23° C. and at a relative atmospheric humidity of 50%. Preferred accordingly is a combination of adhesive and lubricant wherein the peel adhesion of the activatable PSA on the second side of the adhesive tape on such a substrate, at a removal speed of 300 mm/min, after one hour of storage, is not higher than 30% of the peel adhesion after 24 h of storage.

In accordance with the compatibility with the adhesive, the lubricant is selected with the idea that the lubricant first, during the joining procedure with the second substrate, allows the substrate to slide on the tacky second side of the adhesive tape, but is then removed from the contact surface by diffusion.

Nonaqueous lubricants which can be used are all nonaqueous lubricants or slip agents known to the skilled person, with the exception of solid lubricants which are present as particles (e.g., graphite), and hence include oils, greases, petrolatums, hotmelt lubricants, and mixtures thereof, for example.

As nonaqueous lubricants it is also, however, possible to use liquid components, of the kind used in the formulation of adhesive or surface coating materials, examples being low molecular mass polymers, liquid resins (plasticizing resins) or reactive resins. Also conceivable is the use of silicone oils, in the case of silicone-based PSAs, for example. Also suitable are polyols, such as glycerol, liquid hydrocarbons of relatively high molecular mass, such as paraffins, plasticizers, such as phthalates, and also fatty acids and esters thereof. Such fluids may in accordance with the invention also be used as part of a mixture, solution, or emulsion.

Particularly suitable lubricants are those from the following group: oils, greases, petrolatums, hotmelt lubricants, low molecular mass polymers, plasticizers, liquid resins, reactive resins, polyols, fatty acids and their esters, and silicone oils.

According to the second aspect of the invention, nonaqueous lubricants selected and used according to the invention are those from the following group: greases, petrolatums, hotmelt lubricants, low molecular mass polymers, plasticizers, liquid resins, reactive resins, polyols, and fatty acids and their esters.

The lubricant is preferably selected from the group of the mineral oils or synthetic oils, since these are often used as a component in PSAs and are therefore compatible with numerous activatable PSAs.

More preferably the lubricant is selected from the group of the liquid tackifier resins (liquid resins, plasticizing resins; see Satas) and reactive resins, since such resins are often included as peel adhesion reinforcers in PSAs and are therefore likewise highly compatible.

For the joining of metallic substrates, such as of steel profiles, for example, is it particularly preferred for the lubricant to be selected from the group of anticorrosion oils and forming oils. These oils have a high slag resistance, and therefore remain substantially in the applied layer thickness on the adhesive tape or the substrate. They are based in general on mineral oils, synthetic oils, or polymers (e.g., waxes or else biogenic polymers), and often contain additives. Such oils are available for example from companies such as Quaker under the Ferrocoat® brand, from Rhenus under the Rotanor® band, from Fuchs under the Anticorit® brand, from Zeller & Gmehlin under the Multidravv® brand, and from Wocklum under the Furochem® brand.

With very particular preference the lubricants are selected from the group of lubricants approved according to VDA 230-213 (test methods for the product classes of prelube, prelube 2, hotmelt, and spot lubricant; German Automobile Industry Association (VDA), Forming Lubricants Technical Group).

Automakers generally require coils, blanks, pressed parts and drawn parts made from aluminum-coated and uncoated steel sheets to be protected from corrosion as they come from the rolled mill, and the products employed for these purposes have to have a series of properties.

These products are required to protect the metal surfaces in the as-supplied state, and also to protect the parts manufactured therefrom, against corrosion for the prescribed time under the relevant climatic conditions, and may not lead to operational disruptions during application in the cold-rolling mill and in the subsequent production steps among the individual automakers.

The test protocols compiled in VDA 230-213, and the minimum requirements prescribed by the automakers identified therein in the notes, serve for the development of the products identified in the title of the VDA standard. Lubricants meeting these minimum requirements are products of the preferred product class identified above.

In this context, prelube is an anticorrosion oil based on mineral oil, synthetic oil, or from renewable raw materials, with heightened requirements (relative to anticorrosion oil) concerning the deep-drawing and lubricating properties, for use as a finishing oil on all presently known coated and uncoated metal sheets of steel.

Hotmelts are lubricants which at room temperature (20° C.-22° C.) form nonrunning, pasty, thin films almost firm to the touch, based on mineral oil, synthetic oil, or from renewable raw materials, with heightened requirements concerning the deep-drawing and lubricating properties by comparison with prelubes. These products must be suitable for use as a concluding coating on all presently known substrates, i.e., uncoated or coated metal sheets of aluminum materials and steel.

Spot lubricants are products based on mineral oil, synthetic oil, or from renewable raw materials, with heightened requirements concerning the deep-drawing and lubricating properties, and are to be applied shortly before the forming operation only in the event that the finishing oil applied at the roll mill proves not to be sufficient for forming.

Approved lubricants are, for example, Rustilo S 40 and Iloform 951HM from Castrol, Anticorit RP 4107 S, Anticorit PL 3802-39 S, Anticorit PL 39 SX, Renoform MCO 3802, Renoform MCO 3028, Anticorit PL 39 SX, Anticorit PL 3802-39 LV from Fuchs, Platinol B 804 3 COW from Oest, AP 170, AP 168/14, AP 167/22, AP 221, AP 227, AP 228/2 from Pfinder, Ensis PL 1608 from Shell, Wedolit N22-3 and Wedolit N 22 NV from Wilhelm Dietz, Hotmelt E1, Multidraw PL 61, KTL N16, Drylube E1 from Zeller+Gmelin, and Ferrocoat 6130 from Quaker. Preferred lubricants are those selected from this group.

The amount of the lubricant applied to the surface of adhesive tape or substrate is preferably between 0.1 and 10 $g/m^2$, preferably between 0.5 and 5 $g/m^2$. An amount lower than 0.1 $g/m^2$ harbors the risk of inadequate sliding, while an amount higher than 10 $g/m^2$ harbors the risk of a detrimental effect on adhesive bonding.

The lubricant may be present on the second side of the adhesive tape and/or on the second surface of the second adherend.

The lubricant is advantageously on the second side of the adhesive tape, since by this means it is necessary only to provide precise wetting by lubricant of the surface which itself is tacky and comes into contact with the second substrate.

With further advantage the lubricant is located on the second side of the second adherend prior to bonding. This is especially advantageous when the lubricant for the substrate fulfills another function as well as the lubricating, such as the function of corrosion control. In that case, in general, a greater part of the substrate is wetted with the lubricant than is necessary for the purpose of lubricating during joining.

The lubricant may be applied by any of the methods known to the skilled person, hence for instance by coating, printing, spraying or dipping.

The combination of lubricant and activatable PSA is preferably selected such that the bond strength of a section of the activatable PSA 200 µm thick, following activation in a tensile shear test at 23° C. and a relative atmospheric humidity of 50% of the steel substrate coated with 1 $g/m^2$ of the lubricant, ata removal speed of 1 mm/min, is not more than 15%, more preferably not more than 10%, lower than on a steel substrate not coated with lubricant.

Preferred combinations are as follows:
activatable adhesives comprising epoxide monomer and/or epoxy resin, with lubricants based on mineral and/or synthetic oil
activatable adhesives comprising oil absorbers, with lubricants based on mineral and/or synthetic oil
activatable adhesives comprising natural or synthetic rubber, with lubricants based on mineral and/or synthetic oil
activatable adhesives comprising natural or synthetic rubber, with lubricants composed of liquid resins based on hydrocarbons
activatable adhesives comprising particulate oil absorbers, with lubricants based on reactive resins or liquid resins
activatable adhesives comprising at least a reactive resin, with a lubricant from the same chemical group as the reactive resin.

From the same chemical group here means that the lubricant contains reactive groups which the reactive resin also contains, examples being cyclic ethers, hydroxyl groups, carbonyl groups, amines, and also vinyl or allyl groups.

The activatable, pressure-sensitive adhesive tape may also comprise a plurality of layers of activatable PSAs. The latter may be the same or different, and are preferably different. Preferably, then, the first side of the adhesive tape comprises a layer of a first activatable PSA, and the second side of the adhesive tape comprises a layer of a second activatable PSA. The thickness of the layers as well may be the same or different. With preference the layers are of different thicknesses, since by varying the thicknesses it is possible to variably adapt the adhesion properties to different substrates, and the behavior with respect to the lubricant.

The adhesives differ preferably in compatibility with the lubricant. Hence it is preferred for the peel adhesion of a section 200 µm thick of the first activatable PSA from the first side of the adhesive tape, at 23° C. and a relative atmospheric humidity of 50%, on a steel substrate coated with 1 $g/m^2$ of oil, at a removal speed of 300 mm/min, after one hour of storage to be higher than 50% of the peel adhesion after 24 h of storage.

The peel adhesion of a section 200 µm thick of the second activatable PSA on the second side of the adhesive tape, at 23° C. and a relative atmospheric humidity of 50%, on a steel substrate coated with 1 $g/m^2$ of oil, at a removal speed of 300 mm/min, after one hour of storage, is preferably less than 50%, more preferably less than 30%, of the peel adhesion after 24 h of storage.

A large contact angle indicates low wettability with the lubricant. In this application, this means that the lubricant wets the adhesive surface only partially and therefore that adhesion to the substrate comes about at the locations that have not been wetted. It is therefore advantageous for the contact angle of the lubricant on the first activatable PSA to be greater than 30°. The contact angle of the lubricant on the second activatable PSA is preferably less than 30°.

Overall it is preferable for the contact angle, measured between a drop of the lubricant and the PSA lying beneath the drop, to differ at least by 10°, preferably by more than 20°.

Where a lubricant from the group of the mineral oils or synthetic oils is used and where the first and second substrates are coated with the lubricant, combinations preferred per se in each case, between first and second activatable PSAs, comprise activatable PSAs on the basis of the polymers and reactive resins, respectively, that are marked by crosses in table 1 below.

TABLE 1

| | | First activatable pressure-sensitive adhesive based on | | | | | | | | |
|---|---|---|---|---|---|---|---|---|---|---|
| | | Polymers | | | | | Reactive resins | | | |
| | | Polyurethane | Synthetic rubber | Acrylate/ methacrylate | Polyolefin | Epoxy | Acrylate/ methacrylate | Polyester/ polyether | Polyurethane polyurea | Silane-terminated polymers (STP) |
| Second activatable pressure-sensitive adhesive based on | Polymers | | | | | | | | | |
| | Polyurethane | | X | | X | X | | | | |
| | Synthetic rubber | | | | | X | | | | |
| | Acrylate/ methacrylate | X | | | X | X | | | | |
| | Polyolefin | | | | | X | | | | |
| | Reactive resins | | | | | | | | | |
| | Epoxy | X | | | X | | | | | |
| | Acrylate/ methacrylate | | | | | | X | | | |
| | Polyester/ polyether | | | | | | X | | | |
| | Polyurethane/ polyurea | | | | | | X | | | |
| | Silane-terminated polymers (STP) | | | | | | X | | | |

Figure 2:
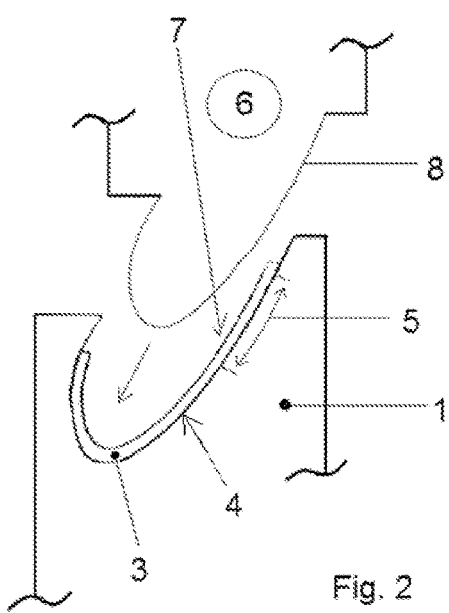
Figure 3:
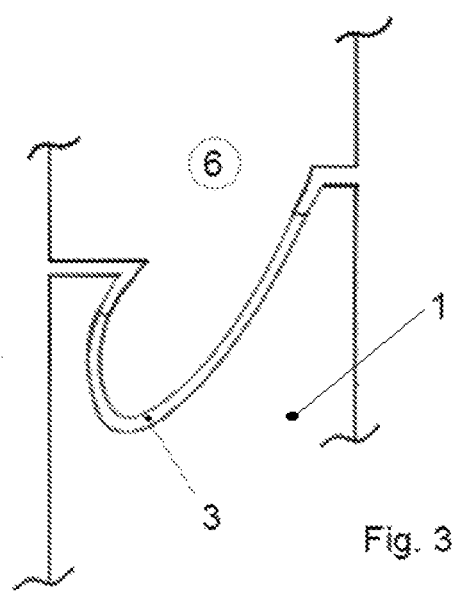
Figure 4A:
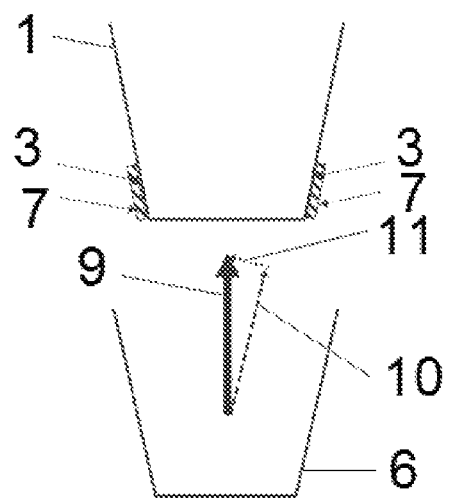
Figure 4B:
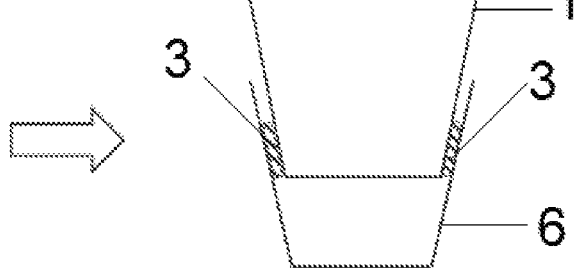

The invention is described with reference to a number of exemplary embodiments, and in this connection;

FIG. 1 shows a preliminary assembly with an adhesive tape applied to a first surface of a first adherend, FIG. 2 shows the preliminary assembly produced in FIG. 1, which is applied in at least partially tangential movement to a second surface of a second adherend, FIG. 3 shows first and second adherends bonded with the adhesive tape of the invention, FIG. 4a shows a vectorial division of the joining movement into a tangential component and a perpendicular component with respect to a second surface of the adhesive tape, FIG. 4b shows first and second adherends assembled by joining.

The figures are not to scale. FIG. 1 shows a first adherend 1. This is an oil-coated metal panel of the kind used in bodywork construction for automobiles. An adhesive tape 3 is stuck to a first surface 2 of the first adherend 1. The adhesive tape 3 is stuck to the first adherend 1 in a first method step. The adhesive tape 3 has a first side 4 which is bonded on the first surface 2 of the first adherend. The first side of the adhesive tape is coated with a first activatable PSA. The association of adhesive tape 3 and first adherend 1 according to FIG. 1 is also referred to here as the preliminary assembly. The composition of the first PSA is preferably such that the oil present on the metal panel is absorbed quickly or displaced during application and therefore establishes an adhesive bond with the first adherend 1.

FIG. 2 shows a second method step. A second adherend 6 is joined to the first adherend 1 in a joining movement which includes a tangential movement component relative to the first adherend 1. With regard to at least a region 5 of a second adhesive tape side 7 which is opposite the first adhesive tape side 4, the joining movement includes a tangential movement component in the sense that a second surface 8 of the second adherend 6 moves, as a result of the joining movement with a tangential movement component, to the second side 7 of the adhesive tape in the region 5.

The tangential component of the joining movement, and a component thereof perpendicular to the second side 7 of the adhesive tape 3 in the region 5, have a ratio of 0.5, preferably 1.0, more preferably of more than 4.

The second side 7 of the adhesive tape 3 is formed by a second activatable PSA. The second surface 8 of the second adherend 6 is coated in accordance with the invention with a nonaqueous lubricant. As a result of the effect of the lubricant, the second surface 8 of the second adherend 6 slides along on the second side 7 of the adhesive tape 3, without the adhesive tape 3 slipping. The second side 7 of the adhesive tape 3 therefore does not attach immediately on first contact to the second surface 8 of the second adherend 6.

FIG. 3 shows a third method step, in which the first and second adherends 1, 6 and the adhesive tape 3 have reached their final position relative to one another. In the position shown in FIG. 3, the two PSAs are activated and produce a strong adhesive bond of the first surface 2 of the first adherend 1 to the second surface 8 of the second adhered 6. The composition of the second PSA is preferably such that it absorbs the lubricant applied to the second surface 8 of the second adherend 6, allowing a firm bonded connection to be produced between the adherends 1 and 6 following activation of the PSAs.

FIG. 4 shows in part a) two adherends 1 and 6, the adherend 1 having two adhesive tapes 3 stuck to it so as to produce a preliminary assembly. The second surface 7 of the adhesive tapes 3 is furnished with a lubricant. The second adherend 6 is guided toward the first adherend 1 with the joining movement 9. The joining movement 9 may be broken down into a component 10 tangential to the second surface of an adhesive tape, and a component 11 perpendicular thereto. The angle between the tangential and vertical components 10 and 11 is 90°. The ratio between tangential and perpendicular components is greater than 0.5 and here in particular greater than 4. As a result of the joining movement and the subsequent adhesive bonding with activation of the activatable PSA, the two profiles 1 and 6 are nested, as shown in part b) of FIG. 4.

Table 1 shows initially preferred combinations of a first activatable PSA and a second activatable PSA. The idea behind the table is that of designing the first activatable PSA in such a way that it adheres as quickly as possible to the oil-coated metal sheet forming the first surface 2 of the first adherend 1; the first activatable PSA is based, for example, on a polymer that is based on synthetic rubber or polyolefins, while the reactive resin selected is an epoxide.

The second activatable PSA is selected such that it attaches only with a delay to the second surface 8 of the second adherend 6, which is likewise an oil-coated metal sheet; the second PSA is based preferably, for example, on a polyurethane or acrylate, while the activatable part selected in turn is an epoxide. Every PSA is based on a viscoelastic part and an activatable part, with the viscoelastic part based on one of the abovementioned polymers and the activatable part on a reactive resin in the sense of the definition given at the outset for "based". Preference is given to combining viscoelastic parts with viscoelastic parts, reactive parts with reactive parts, or reactive parts with viscoelastic parts in accordance with table 1.

This means that provided the reactive part of the first adhesive comprises epoxy resin, the elastomer of the second adhesive is selected preferably freely from the group indicated in table 1, and also any resin from the stated group, with the exception of epoxide, is preferred as a reactive resin of the second adhesive, or that first adhesives based in the viscoelastic part on a polyolefin or synthetic rubber are preferably combined with second adhesives based on a polyurethane or acrylic polymer, or that first adhesives based in the viscoelastic part on a polyolefin or synthetic rubber are preferably combined with second adhesives whose reactive part is based on epoxy resin.

In experiments, activatable PSAs K1 to K4 were produced. The activatable PSAs are based on the following raw materials:

Raw Materials Used
Base Polymers

| Breon N41H80 | Nitrile butadiene rubber with an acrylonitrile fraction of 41% from Zeon Chemicals (London, UK) |
| Desmomelt 530 | Largely linear hydroxyl polyurethane. Desmomelt 530 is a highly crystalline, elastic polyurethane of very low thermoplasticity from Bayer MaterialScience. The enthalpy of fusion as measured by DSC is 54.7 J/g. |
| Poly bd R 45 HTLO | Hydroxyl-terminated polybutadiene from Cray Valley with a molecular weight Mw of about 2800 g/mol and a hydroxyl functionality of about 2.5 |
| Polyvest MA 75 | Maleic anhydride-functionalized polybutadiene from Evonik with a molecular weight Mw of about 3000 g/mol and an acid number of about 80 mg KOH/g |
| Azalt 50/70 | Bitumen 50/70 (B65) from Total |

Reactive Resins

| Epikote 828 | Difunctional bisphenol A/epichlorohydrin liquid epoxide with a weight per epoxide of about 190 g/eq from Momentive. Viscosity at 25° C. of about 13 Pa s. |
| PolyDis PD3611 | Nitrile rubber-modified epoxy resin based on bisphenol F diglycidyl ether with an elastomer content of 40% and a weight per epoxide of 550 g/eq from Schill + Seilacher "Struktol". Viscosity at 25° C. of 10 000 Pa s. |
| PolyDis PD3691 | Nitrile rubber-modified epoxy resin based on bisphenol A diglycidyl ether with an elastomer content of 5% and a weight per epoxide of 205 g/eq from Schill + Seilacher "Struktol". Viscosity at 25° C. of 300 Pa s. |
| Tactix 556 | Dicyclopentadiene-epoxy-novolac resin with a weight per epoxide of 215-235 g/eq and a softening point of 53° C. from Huntsman. |

Curing Agents

| Dyhard 100S | Latent curing agent from AlzChem for epoxy systems, consisting of micronized dicyandiamide in which 98% of the particles are smaller than 10 μm. |
| Dyhard UR500 | Latent uron accelerator for epoxy systems, in which 98% of the particles are smaller than 10 μm. |
| Mahlschwefel 80/90° | Twice-refined soluble elemental sulfur with a purity of at least 99.9% from Avokal |
| MBTS | 2,2'-Dibenzothiazyl disulfide from Weber&Schaer |
| TEDA | Triethylenediamine crystal from Trigon (1,4-diazabicyclo[2.2.2]octane) |

Fillers

| Weißfeinkalk | Calcium oxide CL 90 - Q -90 from Rheinkalk |
| Talkum | Pharma M Talc from Scheruhn, BET surface area about 4.6 m$^2$/g |
| Printex 60 | Furnace black, oil absorption No. 118, BET surface area about 115 m$^2$/g |

The table below shows the composition in parts by weight of adhesives K1 to K4 on the basis of the raw materials identified above:

Adhesives:

TABLE 2

| | Example: | | | |
|---|---|---|---|---|
| | K1 Parts by wt | K2 Parts by wt | K3 Parts by wt | K4 Parts by wt |
| Breon N41H80 | 20 | 20 | | |
| Desmomelt 530 | | | 20 | |
| Epikote 828 | 80 | | | |
| PolyDis PD3611 | | 65 | 30 | |
| PolyDis PD3691 | | 15 | 10 | |
| Tactix 556 | | | 40 | |
| Dyhard 100S | 5.56 | 2.49 | 3.51 | |
| Dyhard UR500 | 0.56 | 0.25 | 0.35 | |
| Poly bd R 45 HTLO | | | | 28 |
| Polyvest MA 75 | | | | 15.1 |
| Azalt 50/70 | | | | 15 |
| Mahlschwefel 80/90° | | | | 16 |
| MBTS | | | | 1.5 |
| Weißfeinkalk | | | | 3 |
| Talkum | | | | 15 |
| Printex 60 | | | | 6.1 |
| TEDA | | | | 3 |

The activatable PSAs K1 to K4 were prepared in the laboratory by dissolving the polymer in butanone at 23° C. Next the reactive resins were added. Subsequently the curing agent was added with vigorous shearing by stirring.

To produce layers of adhesive, the various adhesives were applied from a solution to a conventional liner (siliconized polyester film) by means of a laboratory coating apparatus, and were dried. The layer thickness of adhesive after drying was 200±10 µm. Drying took place in each case initially at RT for ten minutes and for ten minutes at 105° C. in a laboratory drying cabinet. The dried layers of adhesive were each lined, immediately after drying, with a second liner (siliconized polyester film with lower release force) on the open side.

For K5, first of all two components were prepared: the A component was prepared by mixing the raw materials indicated, apart from the Polyvest MA75, in a planetary mixer or dissolver for two hours. To obtain a bubble-free product, the mixture was degassed during the final ten minutes of the mixing process by application of a reduced pressure of less than 0.02 bar (15 torr). The result in each case was a paste which can be processed further at room temperature. The B component was the Polyvest MA75.

A and B components were mixed together on a 2-component mixing system and immediately coated out on a customary coating unit, onto a double-sided release paper, to give a pasty film 200 µm in thickness. On subsequent passage through a heating tunnel, crosslinking took place at 70° C. to form the pressure-sensitive adhesive layer.

Lubricants:

G1: Ferrocoat 6130 from Quaker, a paraffinic oil (CAS 64742-65-0) having a viscosity of about 150 mPa s G2: Anticorit PL 3802-39S, prelube oil from Fuchs, based on naphthenic oil (CAS 265-156-6) with a viscosity of about 300 mPa s G3: Wingtack 10 from Cary Valley, an aliphatic hydrocarbon resin having a viscosity of about 30 Pa s G4: Epikote 828 from Momentive, an epoxy resin based on the diglycidyl ether of bisphenol A and having an epoxy equivalent of about 190 g with a viscosity of about 13 Pa s.

G5: Uvacure 1500 from Cytec, a cycloaliphatic diepoxide (3,4-epoxycyclohexane or methyl 3,4-epoxycyclohexylcarboxylate) with a viscosity of about 275 mPa s.

G6: Demineralized water, viscosity about 1 mPa s

Lubricants G1 and G2 are oils typically used in the production of automobiles, whereas lubricants G3, G4 and G5 are composed primarily of constituents which are constituents of (activatable) PSAs and are therefore easier for the PSA to absorb. G3 is a nonreactive resin, whereas lubricants G4 and G5 comprise reactive resins. As a comparative substance from the prior art, water (G6) was selected.

Measurement Values:

TABLE 3

| Example: | K1 | K2 | K3 | K4 |
|---|---|---|---|---|
| Peel adhesion instantaneous, uncured (steel)/N cm$^{-1}$ | 5.0 | 12.1 | 6.7 | 2.6 |
| Peel adhesion after 24 h, uncured (steel with lubricant G1)/N cm$^{-1}$ | 4.2 | 4.5 | 2.8 | 2.1 |
| Peel adhesion after 1 h, uncured (steel with G1)/N cm$^{-1}$ | 2.2 | 1.3 | 0.1 | 1.8 |
| Dynamic shear test (steel)/MPa | 13 | 12 | 31 | 12 |
| Dynamic shear test (steel with G1)/MPa | 11 | 11 | 28 | 11 |
| Wetting angle/° | | | | |
| G1 | | | 7 | 33 |
| G2 | | | 13 | 30 |
| G4 | | | 55 | 76 |
| G5 | | | 41 | 51 |
| G6 | | | 93 | 103 |

The peel adhesions shown in table 3 for the uncured adhesive tapes were determined in analogy to ISO 29862 (method 3) at 23° C. and 50% relative atmospheric humidity with a removal speed of 300 mm/min and a peel angle of 180°. The thickness of the layer of adhesive was 200 µm in each case. An etched PET film 50 µm thick was used as reinforcing film, and is obtainable from Coveme (Italy).

The substrate used comprises steel plates in accordance with the standard. In some cases these plates were coated with lubricant in an amount of about 1 g/m$^2$. The measuring strip was bonded using a roll-on machine at a temperature of 23° C. The adhesive tapes were removed immediately after application or after a storage time of one or 24 h, respectively. The measurement value (in N/cm) was obtained as the mean value from three individual measurements.

In the determination of the peel adhesion on oiled steel substrates, a paraffinic oil with a viscosity of about 300 mPa s was used (Ferrocoat 6130).

The dynamic shear value shown in table 3 was determined in a tensile shear test. The parameter for the quality of the bonding achieved was the bond strength determined for the various adhesive tapes and lubricants on an assembly produced by the method of the invention. For this purpose, the bond strength was determined quantitatively in each case in a dynamic tensile shear test based on DIN-EN 1465 at 23° C. and 50% rh for a test speed of 1 mm/min (results in N/mm$^2$=MPa).

The test rods used were made of steel and were cleaned with acetone prior to bonding. The lubricant, where used, was applied by immersion of the test rod into a solution of the lubricant to transfer it to one of the test elements. The solutions were adjusted so as to deposit a layer of about 1 g/m$^2$ of the lubricant. The layer thicknesses of the adhesive tapes were about 200 µm in each case. After joining had taken place, the bonded test elements were stored at 23° C. for 24 hours and then cured at 180° C. for 30 minutes. The figure reported is the mean value from three measurements.

The wetting angle shown in table 3 was determined by means of another common test method. The static contact angle of the lubricant was measured in a method based on DIN EN 828, the drop volume selected here being about 4 µl. The measurement was undertaken at a temperature of 23° C. The angle reported here is the mean wetting angle from three measurements.

In accordance with the standard, the contact angle was measured about 10 s after the end of metering.

Table 3 shows that the peel adhesion resulting from use of the lubricant G1, for which the experiments were carried out, after 24 hours and after one hour, is consistently lower, but the decrease is heavily dependent on the particular adhesive used. The adhesives K1 and K4 absorb the oil comparatively quickly, and so after an hour of storage the peel adhesion is higher than 50% of the peel adhesion after 24 h of storage, whereas the adhesives K2 and K3 absorb the oil more slowly, so that the peel adhesion after an hour of storage is not higher than 30% of the peel adhesion after 24 h of storage. Preferably, therefore, the adhesives K1 or K4 would be selected for the first side 4 of an adhesive tape 3 for the bonding of two oiled metal sheets 1 and 6, whereas the adhesives K2 or K3 would be selected for the second side 7 of the adhesive tape 3. In spite of the slower development of the peel adhesion in the case of the adhesives K2 and K3, the shear strength achieved after activation, as in the case of the adhesives K1 and K4, is only slightly affected by the lubricant, and in particular the shear strength is reduced by not more than 15%, and even, in the case of K2, K3 and K4, by less than 10%.

It is important to assess the lubricity of the various lubricants G1 to G6 applied to the adhesives K1 to K4. In this case, the experimental design selected was as follows:

To simulate the sliding in a tangential joining method, sections of the layers of adhesive produced, measuring 25×25 mm², were laminated by their first side to a clean steel plate in the laboratory, at 23° C. and 50% relative atmospheric humidity. Immediately thereafter a second steel plate, coated with about 2 g/m² of the lubricant, was applied vertically to the second side of the adhesive tape section, and pressed on with a force of about 10 N for about 1 s. Immediately thereafter the steel plates were moved manually in a tangential movement relative to one another, in order to determine the lubricity. Sliding with little application of force was assessed as very good (++); sliding with little application of force but a breakaway torque was assessed as good (+); sliding with moderate application of force and a higher breakaway torque was evaluated as satisfactory (o); sliding with a high application of force was assessed as adequate (−); and sticking was assessed as very poor (−−). Since lubricant G6 could not be coated homogeneously onto the steel plate even with addition of surfactant, a drop of the lubricant measuring about 0.1 ml was applied to the second side of the adhesive. Through the pressing of the second steel plate, which here is untreated, the lubricant drop was distributed on the second adhesive tape surface.

The following table summarizes the result:

TABLE 4

|    | G1 | G2 | G3 | G4 | G5 | G6 |
|----|----|----|----|----|----|----|
| K1 | ++ | ++ | 0  | +  | ++ | −− |
| K2 | ++ | ++ | 0  | +  | ++ | −− |
| K3 | ++ | ++ | 0  | +  | ++ | −− |
| K4 | +  | +  | 0  | +  | ++ | −− |

(Lubricity: ++ very easy, no breakaway torque, + easy, low breakaway torque, 0 moderate, higher breakaway torque, − high, −− sticking, no sliding possible)

First of all it became clear as early as during sample preparation that water is an unsuitable lubricant here, since it cannot be distributed evenly either over the substrate or over the second adhesive tape surface. Lubricants here advantageously were those having a contact angle on the adhesive of less than 60°, since with these lubricants it was easier to produce a homogeneous film. Likewise advantageous is the effect of a viscosity above that of water (>5 mPa s), more particularly a viscosity of above 100 mPa s. In the case of the experiment carried out in the variant described, the water showed no lubricating effects; it was pressed out of the bonded joint, and the adhesion faces stuck to one another.

It is clear that the low-viscosity nonaqueous lubricants G1, G2 and G5 exhibit outstanding lubricating properties. The lubricants G3 and G4, with a viscosity of more than 10 Pa s, exhibit good lubricating properties, but these properties set in only after a breakaway torque, so placing them within the framework of the invention. At the same time, using the example of G1, it was demonstrated that the lubricant is very well tolerated by the adhesives K1, K2 and K4 and that peel adhesions are developed after just a short time. The lubricant is resorbed more quickly by the adhesive K4, leading to relatively high peel adhesions after an hour. However, this still has no adverse effect on the lubricity. The lubricant is resorbed more slowly by the adhesive K3, but likewise leads to only a slight loss of shear strength.

The difference in the resorption rate was utilized in the bonding of a two-ply adhesive tape consisting of a layer of K3 and a layer of K4. In analogy to the lubricity test, the first side of the adhesive tape with the adhesive K4 was laminated onto a steel plate, here furnished with 2 g/m² of the lubricant G1, and the laminated assembly was stored for a minute under aforementioned laboratory conditions. The lubricity test was then carried on as described above with the lubricant G1. In the case of the tangential movement, there was very good sliding on the surface of the adhesive K3, whereas the adhesive K4 already exhibited sufficient sticking on the likewise oiled surface of the first substrate, meaning that there was no shifting of the adhesive tape section there.

LIST OF REFERENCE NUMERALS 1 first adherend
2 first surface of the first adherend
3 adhesive tape
4 first side of the adhesive tape
5 region
6 second adherend
7 second side of the adhesive tape
8 second surface of the second adherend
9 joining movement
10 component of the joining movement tangential to the second side of the adhesive tape
11 component of the joining movement perpendicular to the second side of the adhesive tape

The invention claimed is:

1. A method comprising:
providing an adhesive tape comprising a first side and a second side, wherein:
an activatable adhesive is disposed on the first side;
an activatable pressure-sensitive adhesive is disposed on the second side;
the first side is in contact with a first surface of a first adherend;
a nonaqueous lubricant is disposed between the second side and a second surface of a second adherend;
bonding the first surface and the second surface with the adhesive tape; and
joining in a joining movement the second surface to the second side,
wherein:
the joining movement comprises a tangential component relative to the second side and a perpendicular component relative to the second side;
a ratio between the tangential component and the perpendicular component is greater than 0.5:1;
the nonaqueous lubricant is in fluid form at room temperature;
the nonaqueous lubricant has a dynamic viscosity of at least 5 mPa s measured according to DIN 53019-1 at a measuring temperature of 25° C. and a shear rate of 1 $s^{-1}$; and
the activatable pressure-sensitive adhesive, when applied to the second side of the adhesive tape in a thickness of 200 µm, exhibits a peel adhesion, on a steel substrate coated with 1 g/m² of the nonaqueous lubricant at a removal speed of 300 mm/min after one hour of storage at 23° C. and a relative atmospheric humidity of 50%, of less than 50% of the peel adhesion after 24 h of storage.

2. The method as claimed in claim 1, wherein the nonaqueous lubricant comprises a grease, a petrolatum, a hot-melt nonaqueous lubricant, a plasticizer, a liquid resin, a reactive resin, a polyol, a fatty acid, an ester of a fatty acid, a mineral oil, a paraffinic oil, a naphthenic oil, a synthetic oil, or a silicone oil.

3. The method as claimed in claim 1, wherein the ratio between the tangential component and the perpendicular component is greater than 1:1.

4. The method as claimed in claim 1, wherein the activatable pressure-sensitive adhesive comprises an activated pressure-sensitive adhesive.

5. The method as claimed in claim 1, wherein the activatable adhesive bonds more quickly to an oil-coated surface than the activatable pressure-sensitive adhesive.

6. The method as claimed in claim 1, further comprising, before bonding, coating the first surface and the second surface with the nonaqueous lubricant.

7. The method as claimed in claim 1, wherein the activatable pressure-sensitive adhesive comprises a base polymer and a reactive resin.

8. The method as claimed in claim 7, wherein the base polymer comprises an acrylate, a methacrylate, a polyurethane, a natural rubber, a synthetic rubber, a styrene block copolymer comprising an unsaturated polydiene block, a partly-hydrogenated polydiene block, a fully-hydrogenated polydiene block, a styrene block copolymer comprising a polybutadiene, a styrene block copolymer comprising a polyisoprene, a styrene block copolymer comprising a poly(iso)butylene, a styrene block copolymer comprising a copolymer of at least two of a polyisoprene, a poly(iso)butylene, and a poly(iso)butylene, a polyolefin, a fluoropolymer, a silicone, a polyamide, or a polyhydroxyether comprising a phenoxy resin.

9. The method as claimed in claim 7, wherein the reactive resin further comprises:
  a constituent for a polymer comprising a polyepoxide, a polyester, a polyether, a polyurethane, a polysulfide, a polysiloxane, or an acrylic polymer; and
  a polymer based on a phenolic resin, on cresol, or on a novolac.

10. The method as claimed in claim 1, wherein the adhesive tape comprises a carrier layer comprising a polyethylene, a polypropylene, a cyclic olefin copolymer (COC), a polyvinyl chloride (PVC), a polyester, a polyethylene naphthalate (PEN), an ethylene-vinyl alcohol (EVOH), a polyvinylidene chloride (PVDC), a polyvinylidene fluoride (PVDF), a polyacrylonitrile (PAN), a polycarbonate (PC), a polyamide (PA), a polyethersulfone (PES), or a polyimide (P1).

11. The method as claimed in claim 1, wherein:
  at least one of the activatable adhesive and the activatable pressure-sensitive adhesive comprises an oil absorber;
  the oil absorber comprises a phyllosilicate, a zeolite, silica, a graphite, lime, cellulose and derivatives thereof, an aerogel, a polyurethane, a polyolefin, an acrylate-nitrile-alcohol polymer, an urethane-isocyanate-alcohol polymer, a perlite, silk, peat, straw, or rubber.

12. The method as claimed in claim 1, further comprising:
  applying the nonaqueous lubricant to the second side and thereafter contacting the second side with the second surface;
  applying the nonaqueous lubricant to the second surface and thereafter contacting the nonaqueous lubricant with the second side;
  the nonaqueous lubricant has a boiling temperature under ambient pressure of more than 120° C.;
  the nonaqueous lubricant has a dynamic viscosity of more than 100 mPa s at a measuring temperature of 25° C. and a shear rate of 1 s$^{-1}$;
  the nonaqueous lubricant has a static contact angle relative to the activatable pressure-adhesive of less than or equal to 60° measured at 23° C. and 50% relative atmospheric humidity; and/or
  the nonaqueous lubricant has a dynamic viscosity of less than or equal to 10 Pa s measured according to DIN 53019-1 at a measuring temperature of 25° C. and a shear rate of 1 s$^{-1}$.

13. The method as claimed in claim 1, wherein:
  a contact angle of the nonaqueous lubricant relative to the activatable adhesive is greater than 30°;
  a contact angle of the nonaqueous lubricant relative to the activatable pressure-sensitive adhesive is less than 30°; or
  a contact angle of the nonaqueous lubricant relative to the activatable adhesive is greater than 30° and a contact angle of the nonaqueous lubricant relative to the activatable pressure-sensitive adhesive is less than 30°.

14. The method as claimed in claim 1, wherein the nonaqueous lubricant comprises a mineral oil, a paraffinic oil, a naphthenic oil, a synthetic oil, a silicone oil, an anticorrosion oil, a forming oil, a liquid tackifier resin, or a reactive resin.

15. The method as claimed in claim 14, wherein the anticorrosion oil is present and comprises a prelube anticorrosion oil, a hotmelt anticorrosion oil, or a spot lubricant anticorrosion oil.

16. The method as claimed in claim 1, wherein:
  the nonaqueous lubricant comprises a first component;
  the activatable pressure-sensitive adhesive comprises a second component; and
  the first component is from the same chemical group as the second component.

17. The method as claimed in claim 1, wherein the nonaqueous lubricant is present in an amount of between 0.1 and 10 g/m$^2$.

18. The method as claimed in claim 1, wherein:
  the nonaqueous lubricant is disposed in a drop on the activatable pressure-sensitive adhesive; and
  a contact angle of the drop relative to the activatable pressure-sensitive adhesive differs from a contact angle of a drop of the non-aqueous lubricant relative to the activatable adhesive by at least 10°.

19. A method comprising:
  providing an adhesive tape comprising a first side and a second side, wherein:
    an activatable adhesive is disposed on the first side;
    an activatable pressure-sensitive adhesive is disposed on the second side;
    the first side is in contact with a first surface of a first adherend;
    a nonaqueous lubricant is disposed between the second side and a second surface of a second adherend;
  bonding the first surface and the second surface with the adhesive tape; and
  joining in a joining movement the second surface to the second side,
  wherein:
    the joining movement comprises a tangential component relative to the second side and a perpendicular component relative to the second side;
    a ratio between the tangential component and the perpendicular component is greater than 0.5:1;

the nonaqueous nonaqueous lubricant comprises a grease, a petrolatum, a hotmelt nonaqueous lubricant, a plasticizer, a reactive resin, a polyol, a fatty acid, or an ester of a fatty acid; and the activatable pressure-sensitive adhesive, when applied to the second side of the adhesive tape in a thickness of 200 μm, exhibits a peel adhesion, on a steel substrate coated with 1 g/m² of the nonaqueous lubricant at a removal speed of 300 mm/min after one hour of storage at 23° C. and a relative atmospheric humidity of 50%, of less than 50% of the peel adhesion after 24 h of storage.

20. A method of joining a first adherent to a second adherent, said method comprising:
  (a) providing an adhesive tape comprising a first side and a second side;
    an activatable adhesive disposed on the first side; and
    an activatable pressure-sensitive adhesive disposed on the second side;
  (b) bonding the first side of said adhesive tape to a first surface of said first adherent;
  (c) bonding the second side of said adhesive tape to a second surface of said second adherent in a joining movement;

wherein
a nonaqueous lubricant is disposed between the second side and said second surface of said second adherent and is present during the joining movement;
the joining movement comprises a tangential component relative to the second side and a perpendicular component relative to the second side;
a ratio between the tangential component and the perpendicular component is greater than 0.5:1;
the nonaqueous lubricant is in fluid form at room temperature;
the nonaqueous lubricant has a dynamic viscosity of at least 5 m Pa s measured according to DIN 53019-1 at a measuring temperature of 25° C. and a shear rate of 1 s$^{-1}$; and
the activatable pressure-sensitive adhesive absorbs the nonaqueous lubricant slowly such that the activatable pressure-sensitive adhesive, when applied to the second side of the adhesive tape in a thickness of 200 μm, exhibits a peel adhesion, on a steel substrate coated with 1 g/m² of the nonaqueous lubricant at a removal speed of 300 mm/min after one hour of storage at 23° C. and a relative atmospheric humidity of 50%, of less than 50% of the peel adhesion after 24 h of storage.

* * * * *